United States Patent [19]

Van Duyn et al.

[11] Patent Number: 4,477,864
[45] Date of Patent: Oct. 16, 1984

[54] LAMP ASSEMBLY

[75] Inventors: Paul D. Van Duyn; Jerry J. Johnson, Sr., both of Anderson, Ind.

[73] Assignee: General Motors Corporation, Detroit, Mich.

[21] Appl. No.: 398,671

[22] Filed: Jul. 15, 1982

[51] Int. Cl.³ .................... F21V 3/02; F21V 17/04
[52] U.S. Cl. .................................. 362/311; 362/80; 362/82; 362/353; 362/363
[58] Field of Search .............. 362/31, 72, 61, 75, 362/80, 81, 82, 83, 457, 311, 226, 306, 375, 307, 353, 310, 368, 369, 293, 453, 455, 363; 40/204, 205, 152.2; 248/27.3, 27.1; 340/84, 87, 99, 815.2

[56] References Cited

U.S. PATENT DOCUMENTS

| | | | |
|---|---|---|---|
| 1,443,182 | 1/1923 | Kerwin | 362/368 |
| 1,928,413 | 9/1933 | Douglas | 200/51.12 |
| 2,260,588 | 10/1941 | Smith | 307/157 |
| 2,291,777 | 8/1942 | Wahlberg | 362/80 |
| 2,905,807 | 9/1959 | Stevens | 362/293 |
| 2,963,571 | 12/1960 | Roggan | 362/311 |
| 3,066,218 | 11/1962 | Woodcock | 362/267 |
| 3,229,083 | 1/1966 | George | 362/311 |
| 3,473,015 | 10/1969 | Haas | 362/293 |
| 3,631,738 | 1/1972 | Harper | 248/27.3 |
| 3,806,721 | 4/1974 | Murphy | 362/311 |
| 4,070,568 | 1/1978 | Gala | 362/311 |
| 4,195,330 | 3/1980 | Savage | 362/226 |
| 4,231,082 | 10/1980 | Bull | 362/80 |
| 4,231,083 | 10/1980 | Bull | 362/368 |
| 4,398,240 | 9/1983 | Savage | 362/311 |

Primary Examiner—Richard E. Schafer
Assistant Examiner—David K. Cornwell
Attorney, Agent, or Firm—Edward J. Biskup

[57] ABSTRACT

A lamp assembly which includes a tubular body for supporting a light bulb socket and being formed with a collar that extends radially from the tubular body. A cover is fixed with the collar and has an opening formed therein that causes the light rays emanating from the light bulb to be cast radially outwardly relative to the longitudinal axis of the tubular body.

2 Claims, 6 Drawing Figures

U.S. Patent    Oct. 16, 1984    4,477,864
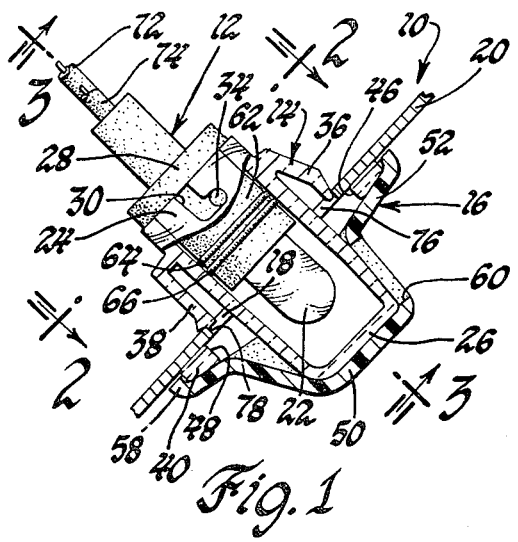
Fig. 1
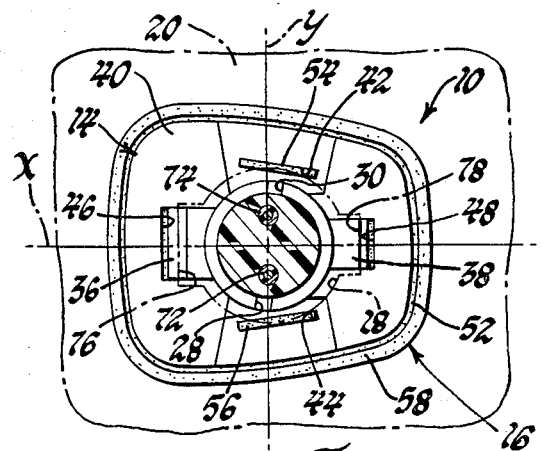
Fig. 2
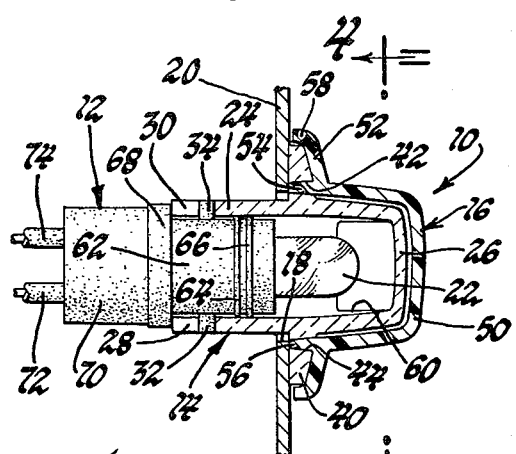
Fig. 3
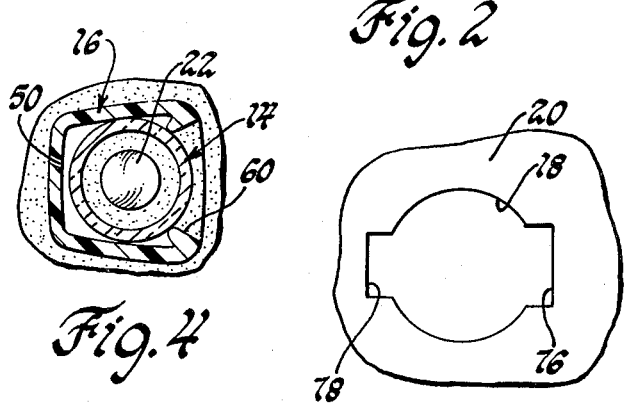
Fig. 4
Fig. 5
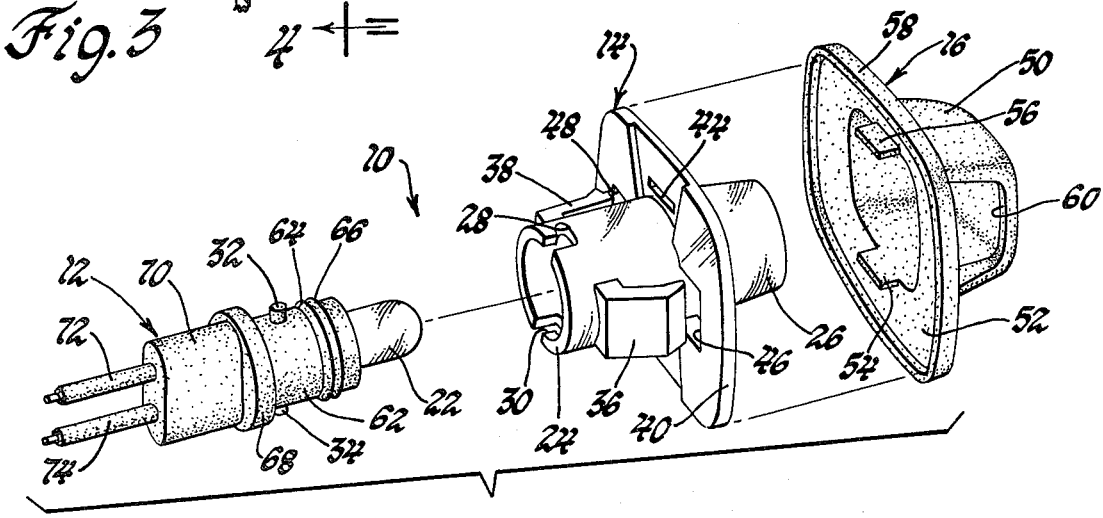
Fig. 6

LAMP ASSEMBLY

This invention relates to a lamp assembly adapted to be mounted in an opening of a support panel for directing a beam of light towards an object, such as the rear license plate of a motor vehicle.

More specifically, the lamp assembly according to the present invention includes a light bulb, a body portion, and a cover. The light bulb is supported in a socket formed with one part of a connector means, while the body portion is tubular in configuration, made of a clear plastic material, and has a closed end and an open end. The open end of the body portion is adapted to receive the socket and is formed with the other part of the connector means for cooperation with the aforementioned one part for fixedly securing the socket to the body portion to thereby locate the light bulb in close proximity to the closed end of the body portion. A collar is integrally formed with and extends radially from the body portion substantially midway between its closed end and open end, and has a pair of apertures formed therein. In addition, the body portion has a pair of arms located at diametrically opposed points adjacent the open end thereof. The arms extend towards the closed end of the body portion, terminate adjacent the collar, and are adapted to cooperate with the collar for retaining the body portion within the opening formed in the support panel. A cover is provided that has a pair of tangs formed thereon which extend through the pair of apertures of the collar. The cover encloses the closed end of the body portion and has an opening for causing a beam of light emanating from the light bulb to be directed towards the object.

The objects of the present invention are: to provide a new and improved lamp assembly adapted to be retained by a support panel and serving to direct light towards an object; to provide a new and improved lamp assembly having a body portion one end of which is open for receiving and retaining a light bulb while the other end is closed and adapted to be located within a cover which serves to direct the light emanating from the light bulb towards an object; to provide a new and improved lamp assembly formed with a tubular body portion which supports a light bulb socket and is formed with a collar that extends radially from the body portion and is connected to a cover that causes the light rays emanating from the light bulb to be cast radially outwardly relative to the longitudinal axis of the body portion; and to provide a new and improved lamp assembly having a tubular body portion an intermediate portion of which is integrally formed with a radially outwardly extending collar which rigidly supports a cover and is also integrally formed with a pair of opposed spring arms which cooperate with the collar for retaining the lamp assembly in an opening of a support panel.

Other objects and advantages of the present invention will be apparent from the following detailed description when taken with the drawings, in which:

FIG. 1 is a partial sectional view of a lamp assembly made according to the present invention and shown mounted within an opening in a support panel;

FIG. 2 is a view of the lamp assembly taken on line 2—2 of FIG. 1 with the support panel broken away to show the rear of the lamp assembly;

FIG. 3 is a longitudinal cross-sectional view of the lamp assembly taken on line 3—3 of FIG. 1;

FIG. 4 is a sectional view of the lamp assembly taken on line 4—4 of FIG. 3 and shows the opening formed in the cover of the lamp assembly for directing light rays radially outwardly from the lamp assembly;

FIG. 5 is a front view showing the opening in the support panel which retains the lamp assembly, and FIG. 6 is an exploded perspective view showing the various parts which when combined form the lamp assembly.

Referring now to the drawings and more particularly FIG. 1 thereof, a lamp assembly 10 according to the present invention is shown which, in general, comprises a lamp socket 12, a body portion 14 and a cover 16, all of which are interconnected to form the lamp assembly. The lamp assembly 10 is mounted within a generally circular opening 18 formed in a support panel 20 so when a light bulb 22 supported by the lamp socket 12 is illuminated, a light beam is cast in a direction radially outwardly relative to the longitudinal axis of the body portion 14 towards an object, such as a license plate (not shown) of a motor vehicle.

More specifically, the body portion 14 is preferably formed from a clear plastic material, such as crystalpolycarbonate, and is tubular in configuration with one end 24 thereof being open and the other end 26 being closed. The open end 24 of the body portion 14 is adapted to receive the lamp socket 12 and is formed with a pair of diametrically opposed twist-in slots 28 and 30 which form one part of a bayonet-type connector means for receiving a pair of lugs 32 and 34 formed on the lamp socket 12 that constitute the other part of the connector means. The connector means consisting of the slots 28, 30 and lugs 32, 34 serve to properly position the light bulb 22 relative to the closed end 26 of the body portion 14 when the lamp socket 12 is inserted into the open end 24.

The body portion 14 is also formed with a pair of diametrically opposed spring arms 36 and 38 each of which is integrally formed on the exterior surface of the body portion 14 at a point near the open end 24 thereof. Each spring arm 36, 38, extends towards the closed end 26 of the body portion 14 and terminates at a point adjacent a collar 40 which is integral with the body portion 14 substantially midway between the open end 24 and closed end 26 thereof. As seen in FIG. 2, the collar 40 is trapezoidal in configuration, extends radially outwardly from the body portion 14 and is formed with a pair of slit-like apertures 42 and 44 located on an axis Y and a pair of rectangular apertures 46 and 48 located along an axis X which is perpendicular to axis Y.

The cover 16 is made of a plating grade plastic material, is hat-shaped in cross section as seen in FIG. 3, and comprises a dome portion 50 integrally formed with a radially extending base 52 having a trapezoidal configuration which corresponds in size and configuration with the size and configuration of the collar 40. A pair of tangs 54 and 56 are integrally formed with the base 52, which in turn, is integrally formed with a skirt 58 that surrounds the base 52. In addition, the dome portion 50 of the cover 16 is formed with an opening 60 so that when the cover combined with the body portion 14 the opening 60 will cause the light emanating from the light bulb 22 to be directed to one side of the lamp assembly 10.

The lamp socket 12 includes a cylindrical portion 62 formed of a resilient rubber-like material that has the aforementioned lugs 32 and 34 integrally formed therewith. Forwardly of the lugs 32 and 34, a pair of identical sealing rings 64 and 66 are provided on the cylindrical portion 62. The rings 64 and 66 are identical in size and have an outer diameter which is slightly larger than the inner diameter of the open end 24 of the body portion 14. The cylindrical portion 62 is also formed with a radially extending circular flange 68 which is integral with a finger section 70 that is oblong in cross section and has embedded therein a pair of electrical wires 72 and 74 that supply electrical current to the light bulb 22 mounted in the lamp socket 12.

As should be apparent from the above description and the drawing, the cover 16 is joined to the body portion 14 by having the tangs 54 and 56 extend through the apertures 42 and 44 in the collar 40 of the body portion 14. The ends of the tangs 54 and 56 are then heat-staked so as to permanently secure the cover 16 to the body portion 14. The combined body portion 14 and cover 16 can then be placed into the opening 18 of the support panel 20 which, as seen in FIGS. 1 and 5, includes a pair of diametrically opposed radially outwardly directed locater slots 76 and 78. It will be noted that the locater slot 76 is slightly larger than the locater slot 78 so as to accommodate the spring finger 36 which as seen in FIG. 2 is slightly larger than the spring finger 38. The placement of the combined body portion 14 and cover 16 into the opening 18 is accomplished by first aligning the spring arms 36 and 38 of the body portion 14 with the properly sized locater slots 76 and 78 and then moving the body portion 14 axially along its longitudinal axis into the opening 18. As the open end 24 of the body portion 14 enters the opening 18, the locater slots 76, 78 will cause the spring arms 36 and 38 to flex radially inwardly toward the body portion 14 and thereafter abut the edges of the locater slots 76 and 78, respectively, for holding the body portion 14 in the fixed position seen in FIG. 1. The lamp socket 12 is then placed into the open end 24 of the body portion 14 with the lugs 32 and 34 entering the slots 28 and 30 followed by a slight rotation or twist of the lamp socket 12 to lock the lamp socket 12 to the body portion 14 and thereby form the entire lamp assembly 10. As should be apparent, the sealing rings 64 and 66, being slightly larger in diameter than the inner diameter of the body portion 14, serve to provide a vapor seal for the light bulb envelope. The flange 68 formed on the cylindrical portion 62 of the lamp socket 12 serves a similar purpose by abutting the open end 24 of the body portion 14.

Various changes and modifications can be made in this construction without departing from the spirit of the invention. Such changes and modifications are contemplated by the inventors, and they do not wish to be limited except by the scope of the appended claims.

The embodiments of the invention in which an exclusive property or privilege is claimed are defined as follows.

We claim:

1. A lamp assembly adapted to be mounted in an opening in a support panel for directing a beam of light emanating from a light bulb towards an object, said light bulb being supported in a lamp socket having one part of a connector means, said lamp assembly including a body portion having a closed end and an open end, said open end adapted to receive said lamp socket and being formed with the other part of said connector means for cooperation with said one part so as to fixedly secure said lamp socket to said body portion and locate said light bulb adjacent said closed end of said body portion; a collar integrally formed with and extending radially from said body portion and being located substantially midway between said closed end and said open end thereof; a pair of spring arms integrally formed on said body portion at diametrically opposed points thereof, each of said spring arms having one end thereof connected to said body portion adjacent said open end and having the other end extending towards said closed end and terminating at said collar, said spring arms adapted to cooperate with said collar for maintaining said lamp assembly in said opening in said support panel, and a cover made of a plastic material and secured to said collar, said cover comprising a dome portion integrally formed with a radially extending base which corresponds in size and configuration with the size and configuration of said collar, a skirt surrounding said base of said cover and located along the periphery of said collar, said collar having an opening formed in said dome portion so as to cause said beam of light emanating from said light bulb to be directed towards said object.

2. A lamp assembly adapted to be mounted in an opening in a support panel for directing a beam of light emanating from a light bulb towards an object, said light bulb being supported in a lamp socket having one part of a connector means, said lamp assembly including a tubular body portion made of a plastic material and having a closed end and an open end, said open end adapted to receive said lamp socket and being formed with the other part of said connector means for cooperation with said one part so as to fixedly secure said lamp socket to said body portion and locate said light bulb adjacent said closed end of said body portion; a collar integrally formed with and extending radially from said body portion and being located substantially midway between said closed end and said open end thereof; a pair of apertures formed in said collar; a pair of spring arms integrally formed on said body portion at diametrically opposed points thereof, each of said spring arms having one end thereof connected to said body portion adjacent said open end and having the other end extending towards said closed end and terminating at said collar, said spring arms adapted to cooperate with said collar for maintaining said lamp assembly in said opening in said support panel, and a cover made of a plastic material and having a pair of tangs formed thereon which are adapted to extend through said apertures and be heat-staked for securing said cover to said collar, said cover comprising a dome portion integrally formed with a radially extending base which correspnds in size and configuration with the size and configuration of said collar, a skirt surrounding said base of said cover adapted to be located along the periphery of said collar when said cover is secured to said collar, said collar having an opening formed in said dome portion so as to cause said beam of light emanating from said light bulb to be directed towards said object.

* * * * *